Feb. 28, 1967   B. T. KEAY ETAL   3,305,997
SPACE STRUCTURES FOR BUILDING PURPOSES
Filed June 11, 1963   8 Sheets-Sheet 4

INVENTORS
BERNARD T. KEAY
LIONEL G. BOOTH
BY
Caswell, Lagaard & Wicks
ATTORNEYS

Feb. 28, 1967 B. T. KEAY ETAL 3,305,997
SPACE STRUCTURES FOR BUILDING PURPOSES
Filed June 11, 1963 8 Sheets-Sheet 7

INVENTORS
BERNARD T. KEAY
LIONEL G. BOOTH
BY
Caswell, Lagaard & Wicks
ATTORNEYS 3,305,997
SPACE STRUCTURES FOR BUILDING PURPOSES
Bernard Thomas Keay, Plot 5, Clarksfield, Lyth Hill Road, Shrewsbury, England, and Lionel Geoffrey Booth, 35 Eccleston Square, London, England
Filed June 11, 1963, Ser. No. 287,007
Claims priority, application Great Britain, June 12, 1962, 22,575/62; Dec. 21, 1962, 48,462/62
4 Claims. (Cl. 52—648)

This invention relates to space structures for building purposes.

For roof and other structures use is sometimes made of grids comprising interconnected ties and struts. Very wide distribution of forces consequent upon locally applied loads is achieved by the use of so-called double-layer grids, particularly true space grids in which the interconnected members outline a pattern of pyramids, octahedra or other geometric space figures distributed over the whole area of the structure.

As an alternative to the aforesaid skeletal space systems, so-scalled folded plate and sheet space grids have been developed in which forces due to external loading are in part sustained in the planes of plates of metal, wood or other material. The use of sheet materials reduces the number of separate components in the structure; moreover the sheets can be formed into prefabricated units which can be easily transported to the building site and then interconnected to form the complete structure.

Plate and sheet structures as hitherto proposed either require an appreciable number of unit-to-unit connections which are vital for the ultimate strength of the structure, or the prefabricated units are made sufficiently long to span the structure one way in which case externally locally applied loads are not so efficiently distributed to all parts of the structure.

The present invention, according to one aspect thereof, provides a space structure which combines ease of assembly with good load distribution. According to the invention a space structure comprises a plurality of elongated prefabricated units each consisting of or comprising a longitudinal rib portion and a wall or walls extending laterally therefrom; the units are laid in two superposed layers so that the units run in two or more different directions along the structure and so that there are two spaced layers of rib portions between which said walls of the units extend, depthwise of the structure; the walls of units of one layer extend at least in part into the depth of the space occupied by the units of the other layer; and the walls of units running in one direction and belonging to one layer are connected with depthwise extending walls of units running in one or more other directions and belonging to the other layer.

Preferably the depthwise extending walls of one layer of units lie wholly within the depth of the space occupied by the units of the other layer, or nearly so. In this case the depth of the assembly of layers is not substantially greater than the depth of one layer.

For forming a structure according to the invention, each of the units of one layer may comprise walls or wall portions spaced in succession along the length of the unit so that the walls or wall-portions of units belonging to the other layer and running in a different direction can extend between these spaced walls or wall portions. The units of the other layer may be provided with walls extending continuously over the length of the units, e.g., they may be in the form of troughs of V-section. However such other units are preferably provided in the same way as the units of the first said layer with a succession of spaced walls or wall portions.

Depending on the form of individual units, particularly of their depthwise extending walls, these walls can adjoin to form various angled wall formations over the area of the structure. For example, each unit of each layer may comprise a succession of spaced flat sheet walls or wall portions each of which adjoins and is connected at right angles to a corresponding wall or wall portion of a unit of the other layer. The units of each layer may all run in the same direction or different groups of units belonging to any given layer may run in different directions in which case the walls of the different groups may be connected together in angled relationship. If units belonging to one layer run in different directions their rib portions lying to the outside of the structure can be formed to intersect but this is not essential since the differently directed rib portions can cross in adjacent planes. It will thus be understood that the ribs of each of the spaced layers of ribs need not be co-planar.

Preferably the walls of different units, e.g., units of different layers, are shaped and arranged so that they co-operate to form open or closed cells.

For most purposes it is intended that the rib portions of units of one or each layer of a structure according to the invention will be interconnected by another outer layer of ribs or other members, e.g., stressed plywood or other sheets forming an outer skin or cladding. Preferably there will be at least one such outer layer of ribs running at an angle to units of the appertaining layer and interconnecting such units.

The invention includes building units of elongated form and comprising a longitudinal rib portion and lateral walls or wall portions extending therefrom in succession along the length of the unit so that a plurality of such units can be assembled in superposed layers to form a structure in which there are two spaced layers of rib portions which run in two or more different directions along the structure and from which said unit walls extend depthwise of the structure, the walls of units of one layer extend at least in part into the depth of the space occupied by the units of the other layer and the walls of units running in one direction and belonging to one layer are connected with depthwise extending walls of units running in one or more other directions and belonging to the other layer.

As will hereinafter be exemplified, a building unit according to the invention may comprise a separately formed rib portion secured to a sheet wall or walls, or the rib portion and the said wall or walls may be integral parts of one and the same piece of material. Building units comprising triangular walls or wall portions disposed side by side along the length of the unit and joining along margins thereof to a common rib portion are very suitable.

A building unit according to the invention may comprise a plurality of sheet walls or plates. For example a plurality of flat plates of triangular or other shape may be attached to a longitudinal rib at successive positions along its length. Such plates may, e.g., lie in a single plane or in planes which diverge from the rib. As an alternative however, a unit according to the invention may incorporate only one sheet wall, this being shaped to provide a series of wall portions spaced in succession along the unit. Such a unit can be formed by attaching an appropriately shaped sheet to a longitudinal rib member. Alternatively an appropriately shaped elongated metal blank can be folded about a longitudinal fold line or lines so that the folded zone forms a longitudinally extending spine or rib portion from which the series of integral wall portions extend in one or more planes. If desired the so formed spine or rib portion may be strengthened by an attached longitudinal member.

In any unit comprising a succession of spaced walls or wall portions extending from a longitudinal rib it is desirable if the unit is of substantial length to provide a further longitudinal rib or ribs interconnecting the marginal portions of the walls or wall portions remote from the first rib. The spaced ribs and the wall or wall portions extending between them then function as the flanges and web of an I-beam. The rigidity imparted by the use of the further rib or ribs is of particular value, e.g., in the case of the units of the bottom layer of a roof spanning a large area since erection is facilitated if the said lower units can be long enough to span the walls of the building without requiring temporary intermediate support.

As already stated structures according to the invention preferably comprise cells. A very effective structure according to the invention is one comprising tetrahedral cells. Such a structure can be formed by two layers of units each of which units comprises at each of successive positions along its length, a pair of triangular walls or wall portions which join or are connected along one margin of the triangle, the walls or wall portions of the successive pairs lying in two divergent planes each containing one of the walls or wall portions of each pair. It is an important advantage of this latter type of unit construction that as the walls or wall portions of the separate prefabricated units lie in two divergent planes, the units can be "nested" one within the other for facilitating storage and transportation. When a plurality of such units are laid in two layers with the units of one layer running normally to the units of the other layer and each pair of walls or wall portions of each unit registering with a pair of walls or wall portions of a unit of the other layer, the resulting structure comprises a layer of interconnected closed tetrahedral cells arranged with opposed corner edge portions of the individual tetrahedral disposed at the opposed sides of the layer. The fact that the triangular walls or wall portions of the units of each layer are interconnected marginally rather than by the apices of such walls or wall portions is conducive to strength and avoids undesirable stress concentrations.

The geometrical configuration of such a structure is new in itself and the invention includes any such structure, whether formed from prefabricated units or not.

While reference has particularly been made to structures formed by two layers of units, a structure according to the invention may incorporate three or more layers. For example a roof structure may comprise two connected layers of interconnected cells, each such layer being formed by assembly of two layers of prefabricated units as above referred to.

The individual prefabricated units can be made of any suitable material or materials, e.g., wood, metal, plastic or concrete. The manner of connecting the walls of the units of different layers will of course to some extent depend in any given case on the materials of the units. Wooden walls may, e.g., to be connected by glueing and/or nailing or screwing and for this purpose some or all of the walls may have connecting fillets thereon. Metal walls may be connected by bolting, rivetting or welding.

Components of or for a structure according to the invention may be pre-formed or marked for facilitating correct relative location of the prefabricated units during assembly. For example outer ribs and the ribs of the prefabricated units may be provided with bolts or bolt sockets at predetermined positions.

While flat structures have been more particularly in view in the foregoing description, the units of or for a structure according to the invention may be shaped to form an arched, "folded" or other special design of structure. Thus, a barrel roof can be formed by a layer of prefabricated longitudinally curved units with a layer of straight units running normally thereto. Quantities of units of two or more dissimilar shapes or styles may be provided for use at different parts of the structure and/or special units for use at corners or other particular positions may be incorporated. The invention is primarily concerned however with flat structures, e.g., for roofing or flooring and particularly for roofing.

Notwithstanding the use of units which are easy to store, transport and assemble a structure according to the invention has great strength and ensures good distribution of forces under locally applied loads. It will be appreciated that loads applied at any positions are resolved into forces which are in part transmitted by the units in two or more directions which may, e.g., be two mutually perpendicular directions.

By means of the invention a cell-type structure can be formed with comparatively few on-site end-to-end unit connections. The number of such connections is not dependent on the number of cells and it is possible to populate a given area with a very large number of cells while making only a few end-to-end unit connections.

Structures according to the invention may be of open form to permit services such as heating or lighting equipment to be accommodated within the depth of the structure. An open structure can moreover be clad so as to include transparent or transluscent panels or the like to enable light to pass through.

Specific embodiments of the invention, selected by way of example will now be described in detail with reference to the accompanying drawings in which.

Figure 1:
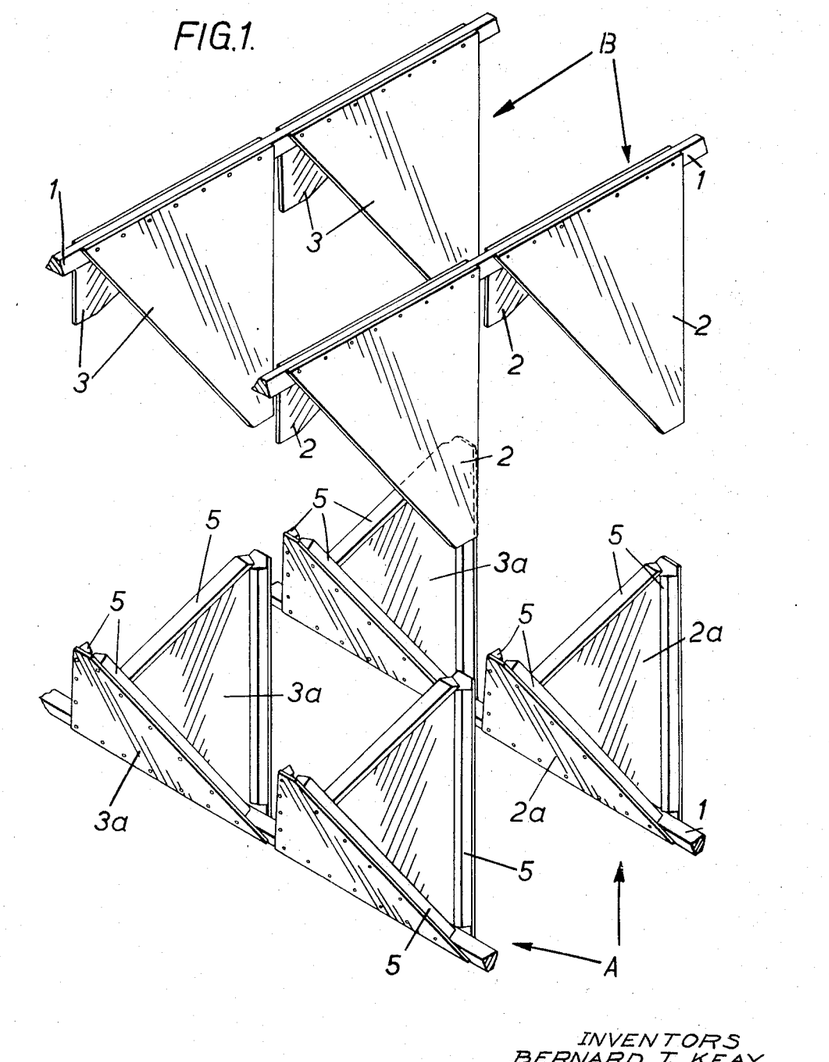
FIG. 1 is an exploded view of portions of a few prefabricated units belonging to the lower and upper layers of a roof structure.
Figures 2, 3:
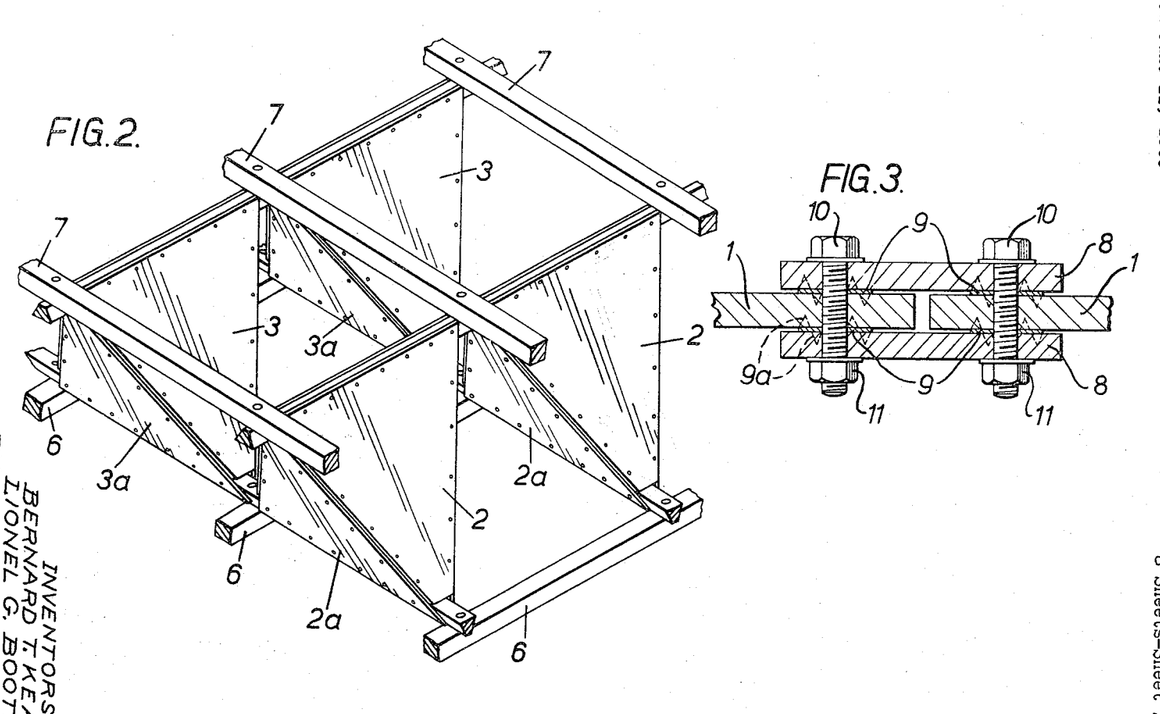
FIG. 2 is a perspective view of part of the complete structure.
FIG. 3 show a type of end-to-end unit connection.

Referring firstly to FIGS. 1 to 3: the illustrated structure comprises two sets of prefabricated units A and B. Each unit comprises a wooden rib 1 of trapezium section to the opposed divergent faces of which pairs of triangular ply-wood plates are fastened at intervals along the length of the rib by glueing and nailing. The drawings show only part of the length of each unit. Each unit may e.g., be of the order of 16′ long with say eight successive pairs of plates. The pairs of plates in the A units are denoted by numerals 2a, 3a, etc., the pairs of plates of the B units are designated 2, 3, etc. The plates of each pair define an included angle of approximately 60°. The units A have wooden strips 5 secured to the inner faces of the ply-wood plates along the margins thereof which diverge from the rib 1. A set of outer ribs 6 are provided which are preformed at spaced positions for interconnection, e.g., by means of bolts, with the ribs of one layer of the prefabricated units and a further set of outer ribs 7 are preformed for connection at predetermined spaced positions with the ribs of the other layer of units.

For forming a roof, ribs 6 can first be laid across the supporting walls and the set of A units can then be connected onto these ribs at predetermined positions shown by the locations of the bolt holes. In consequence the A units are now held with their ribs parallel and in a common plane, the units being at the correct mutual spacing ready for laying the next layer of units, i.e., the B units. The B units are laid normally to the A units so that the ribs of the A and B units are in spaced layers and the ply-wood plates of the upper and lower layers cooperate to form closed tetrahedral cells interconnecting the layers of ribs, as shown in FIG. 2. The plates 2, 2a (and similarly the plates 3, 3a, etc.) are connected by nails or screws passing through the margins of the plates 2, 3, etc., into connecting fillets in the form of strips 5 secured to the inside faces of plates 2a, 3a, etc. Subsequently the outer ribs 7 are bolted to the ribs 1 of the B units. A very rigid structure is thus realised which is capable of sustaining very heavy locally applied loads. The structure can be panelled over or otherwise clad on one or both sides in any desired manner, and has good acoustic properties.

If the size of the roof makes it necessary to join prefabricated units end to end, this can be done in the manner represented by FIG. 3. End portions of the ribs 1 of the units to be joined are disposed between side plates 8 extending across the joint. Between the plates 8 and each of the ribs 1, timber connectors 9 comprising metal plates with opposed sets of teeth which penetrate into the ribs and side plates are disposed between the plates 8 and each of the ribs 1 and the assembly is held by bolt and nut combinations 10, 11 extending through the side plates, the timber connectors and the ribs 1.

As an alternative to the form of rib and plate connections used in the illustrated embodiment of the invention, the ribs may be of square section with mutually inclined longitudinal grooves into which corresponding margins of the opposed series of plates can be secured, e.g., by glueing.

It will be seen that the ply-wood plates of the units of each layer lie wholly within the depth of the space occupied by the units of the other layer. This restriction to single layer depth is not an essential feature of the invention however. By way of modification to the structure shown by FIGS. 1 and 2, the ply-wood plates of the units of the different layers can be so relatively shaped that the plates of the units of the upper layer mate up with the connecting fillets associated with the plates of the other layer when the plates of the upper layer intrude over only a part, say half, of their depth, into the depth of the space occupied by the lower units. In that event the cells formed by the connected layers of units will not be completely closed and the depth of the structure will be greater than the depth of one layer but less than twice such depth.

Figures 4, 5:
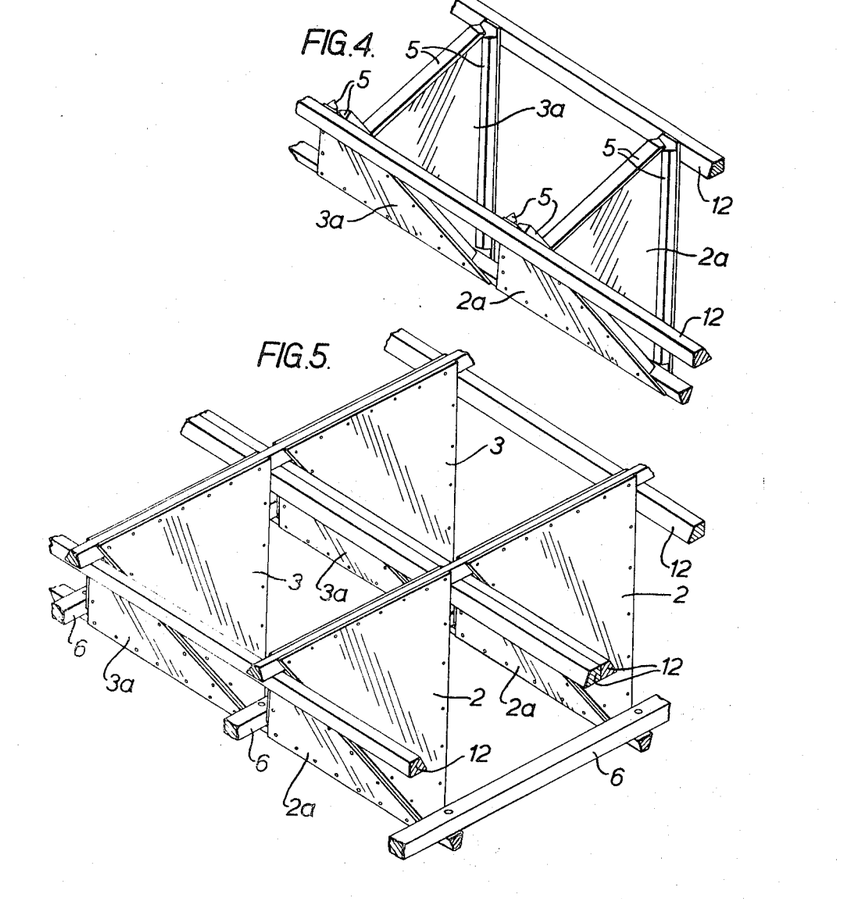
FIG. 4 is a perspective view of part of a modified unit.
FIG. 5 is a perspective view of part of a complete structure incorporating units as shown in FIG. 4.

The maximum distance between supports which can be spanned by a unit of the type shown in FIGS. 1 and 2 without requiring temporary intermediate support depends in part upon the rigidity of the units. In the complete structure the different units mutually support each other but in the process of laying a roof the rigidity of the individual units of the first layer is critical for determining the number of temporary intermediate supports (if any) which are required. A unit of increased rigidity is shown in FIG. 4. This unit corresponds with the A units shown in FIGS. 1 and 2 save in that additional ribs 12 are attached along the projecting apices of the triangular plywood plates. Part of a structure making use of units of this type is shown in FIG. 5. In forming this structure, units of the type shown in FIG. 4 are laid as the bottom layer and units similar to the B units in FIG. 1 are laid as the top layer. The outer layer of ribs 6 which interconnect the bottom layer of units is laid above the rib portions of such units. In designing the upper units for the FIG. 5 structure the spacing of the successive plates along the lengths of the units has to be selected to permit the strengthening ribs 12 of the lower units to be accommodated between them as shown.

Figure 6:
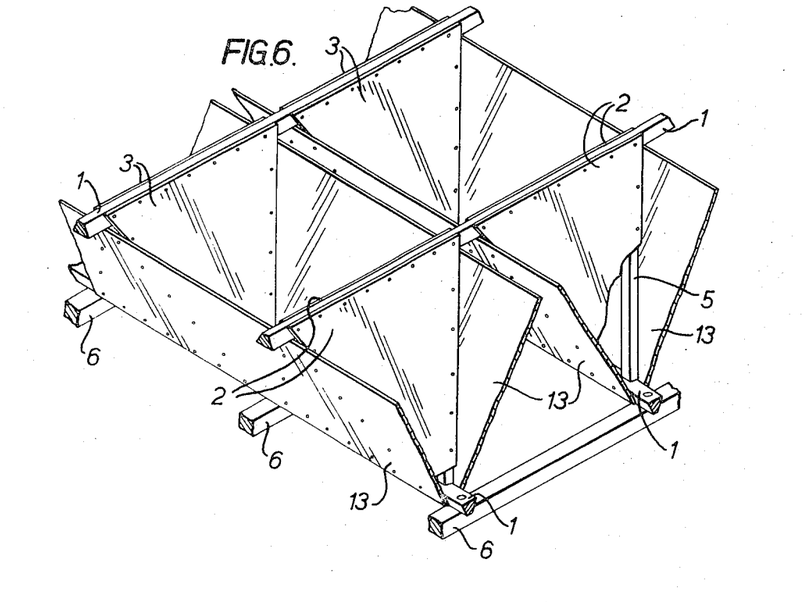
FIG. 6 is a perspective view of part of another structure according to the invention.

In the structures so far described the units of each of the two layers are each provided with a succession of walls along the length of the unit. FIG. 6 shows part of a structure in which an upper layer of units similar to the B units of FIG. 1 are used in conjunction with units provided with walls extending continuously over the length of the units. These lower units in FIG. 6 comprise a longitudinal rib 1 of trapezium section to the mutually inclined faces of which ply-wood walls 13 are secured to form a V-shaped trough. Connecting fillets 5 are secured to the inside faces of the trough walls at appropriate positions to permit the triangular plates of the units of the upper layer to be secured thereto.

Figure 7:
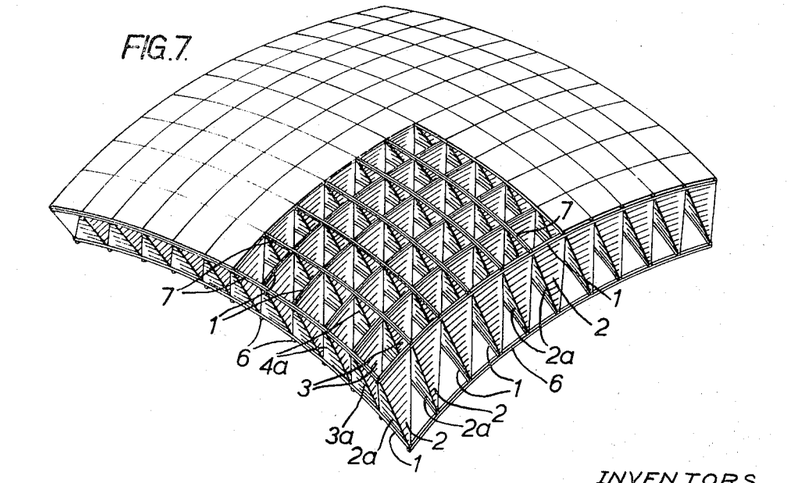
FIG. 7 shows part of a curved structure according to the invention.

An application of the invention to a curved structure is represented in FIG. 7. The structure comprises an assembly of components as represented by FIGS. 1 and 2 save in that the outer ribs and the rib portions of the prefabricated units are curved and the triangular plates of each unit differ inter se as is necessary to enable plates of units of the different layers to register and form closed cells nothwithstanding the curvature of the components. Only a few of the components have been numbered, using the reference numerals of the corresponding parts in FIGS. 1 and 2, sufficient to permit the structure formation to be understood by comparison with the said earlier figures. Thus the nearest of the top layer units carries plates 2 and the next of the top layer units carries plates 3. The bottom layer units each carry plates 2a, 3a, 4a, etc. Tetrahedral cells are formed by the cooperation of plates 2 with 2a, 3 with 3a, 4 with 4a, etc.

It will be clear that a barrel roof structure can easily be formed by assembling a layer of prefabricated units curved in one direction with a layer of straight prefabricated units running in the other direction.

Figure 8:
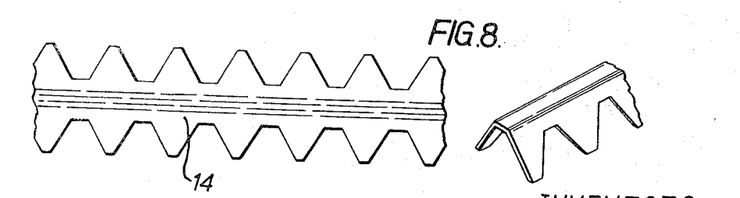
FIG. 8 shows part of a metal blank and a building unit according to the invention formed therefrom.

The units employed in the structures so far described are formed by attaching wall-forming members to a longitudinal rib. An example of a unit formed from a single piece of material is shown by FIG. 8. A blank 14 of the shape shown to the left of the figure is cut from aluminium or other suitable material and the blank is subsequently folded about longitudinal centre lines into the form shown to the right of the figure. The longitudinal folded central zone is relatively stiff and forms a rib or spine portion. The blank is shaped to provide triangular wall portions spaced along the unit, the wall portions being integral with the rib portion. Units according to FIG. 8 are similar in shape to the units represented in FIG. 1 and can be used in the same way as the FIG. 1 units in forming a structure according to the invention. If necessary, the FIG. 8 units can of course be strengthened by securing a separately formed member of the same or another material along the rib portion.

Figure 9:
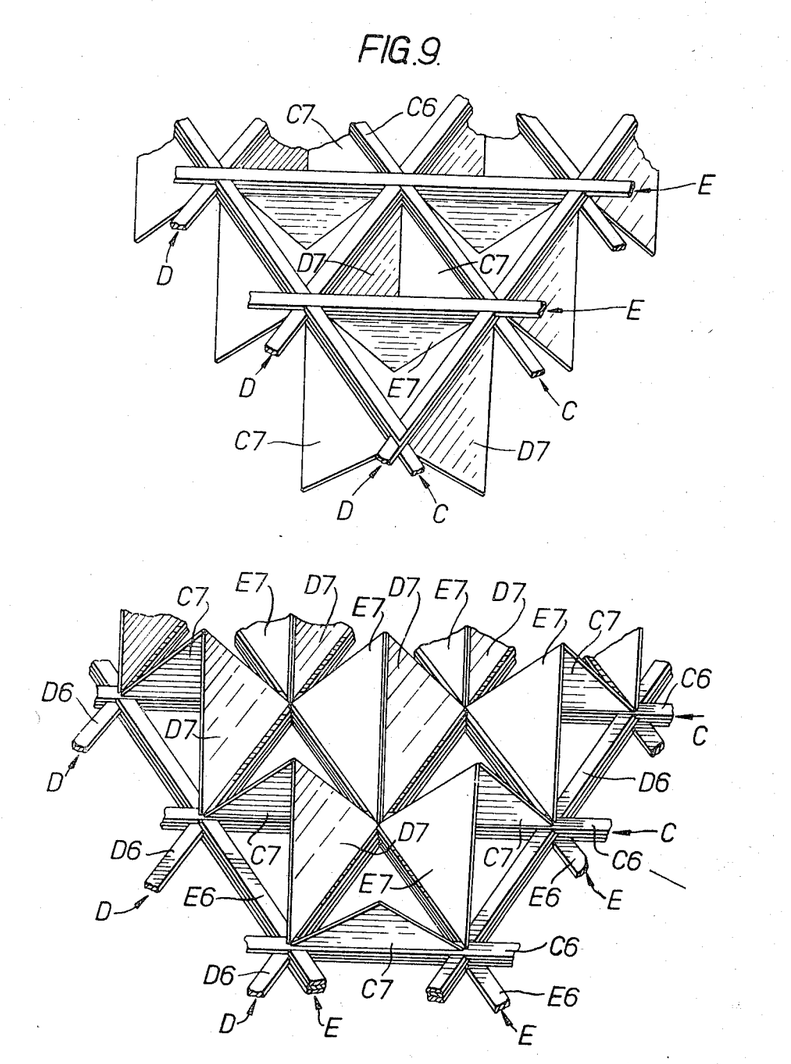
FIG. 9 is an exploded view in perspective of part of a more complex cell-type structure according to the invention.
Figure 10:
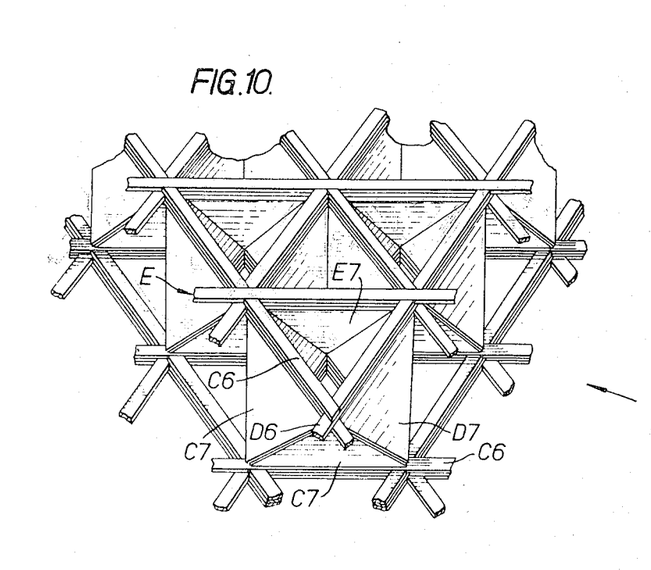
FIG. 10 shows part of this structure complete, from the same perspective as FIG. 9.
Figure 11:
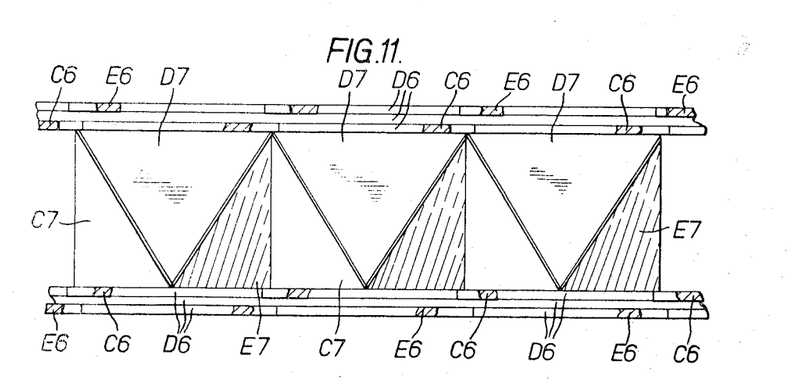
FIG. 11 is a side view of the structure looking in the direction of the arrow in FIGS. 9 and 10.

Reference is now made to the cellular structure shown by FIGS. 9 to 11. This structure can be regarded as comprising two "layers" which are shown separated in FIG. 9. Each said layer is formed by three intersecting rows of units and the two layers are similar.

As denoted in the lower portion of FIG. 9, the bottom layer comprises a row of spaced parallel units C, a second row of spaced parallel units D and a third row of spaced parallel units E. Each unit comprises a longitudinal wooden rib 6 and a succession of co-planar triangular ply-wood plates 7 connected thereto by one side margin of the triangle. The connection may be made by letting a margin of the plates into a groove in the rib and glueing or the plates may be secured to a rib face if this is appropriately angled. In order to distinguish the ribs and plates belonging to different units in the lower part of FIG. 9, the numerals 6 and 7 are preceded by the letter C, D or E according to whether they belong to the C, D or E units.

Between neighbouring triangular plates, the rib of each unit is grooved depthwise so as locally to reduce the thickness of the rib and the reduced portions of the ribs of each row of units are received in the grooves along the ribs of the other rows of units so that the three rows of ribs are accommodated in a common general plane. The grooves in the ribs C6 extend from the bottom face of the ribs, as viewed in FIG. 9, through two-thirds of the rib thickness; the grooves in the ribs D6 extend from each face of the rib, each groove through one-third of the rib thickness; the grooves in the ribs E6 extend from the top face of the ribs through two-thirds of the rib thickness. Actually in the illustrated structure, each rib is of three-laminate structure and the grooves are formed by locally interrupting or removing one or two of the laminates.

In order to construct a "layer," the row of E units is first laid, then the row of D units and finally the layer of C units. The triangular walls mate up in groups of three to form triangular pyramids open at the bottom. This is clearly apparent in FIG. 9. Each pyramid is formed by three walls, C7, D7 and E7. The portion of a structure shown by this figure includes one complete pyramid in the centre of the figure and two incomplete pyramids to each side of it. The two pyramids to each side of the central pyramid are incomplete because the appertaining walls E7 in the case of the left hand pyramids and D7 in the case of the right-hand pyramids have been omitted so as better to reveal the structure.

In building the layer, the ribs 6 are connected together at their intersections by glueing and/or bolting or in any other convenient manner. Captive bolts and/or bolt sockets may be provided as parts of the prefabricated units. The walls forming each pyramid are also secured together. The form of this connection is not shown in the drawings in the interest of simplifying them, but in practice each wall is provided on its inside face, alongside one of its convergent edges, with a connection fillet and in the assembly a margin of one of the other walls of the pyramid is secured to this stiffening strip by glueing and nailing or otherwise. Thus the cell wall interconnection is similar to that used in the structure illustrated in FIGS. 1 and 2.

The upper layer of the structure which is the subject of FIGS. 9 to 11 and which is shown in the top portion of FIG. 9 is similar to the lower layer and corresponding parts are denoted by the same reference numerals in the two parts of the figure. The complete structure combines the two layers inverted one with respect to the other and part of it is shown in FIG. 10. From this it is not to be understood that the second layer is preformed, like the bottom layer, and then brought into position as a whole. On the contrary, the practical mode of assembly is to build up the second layer in situ on the first layer, by first laying the row of units of which the ribs are deeply grooved from the face exposed at the top of the structure (top layer units C) and connecting the walls C7 of these units to walls of the pyramids of the bottom layer and then laying and securing of top D and E units in sucession. The connection of walls belonging to units of different layers may be achieved through connection fillets (not shown) secured at suitable positions along margins of the pyramid walls of the units of one or each layer on the outer faces of such walls. It will be clear from FIGS. 9 and 10 that in the assembly the complete inverted pyramid which appears in the centre of the top part of FIG. 9 fits between the complete pyramid in the centre of the lower part of the figure and the two incomplete pyramids to the fore. Actually the walls 7 of the upper C units fit between the walls 7 of the lower E units, the upper E7 walls fit between the lower C7 walls and the upper D7 walls fit between the lower D7 walls.

The illustrated structure can be clad on one or both sides with any appropriate cladding material to conceal or enclose the structure. Reverting to FIG. 10 it will be seen that a cell open at both sides of the structure is formed at each area bounded by three inverted pyramids and these cells can be covered with transparent or translucent panels or the like to enable light to pass through the structure.

With a structure as described and illustrated, no undesirable stress concentrations occur under load. The geometric configuration of the structure is new in itself and the invention includes any structure of such general configuration whether formed from prefabricated units or not.

The illustrated cellular structure is a wooden structure but a similar structure can for example be made in metal or metal and wood or wood and plastic. The particular method employed for connecting units together will of course depend in each case on the materials of the shear-transmitting walls and rib portions of the units.

Although the invention is preferably employed for constructing cell-type space structures, the invention includes non-cellular structures and an example of such a structure will now be described with reference to FIGS. 12 to 14.

Figure 12:
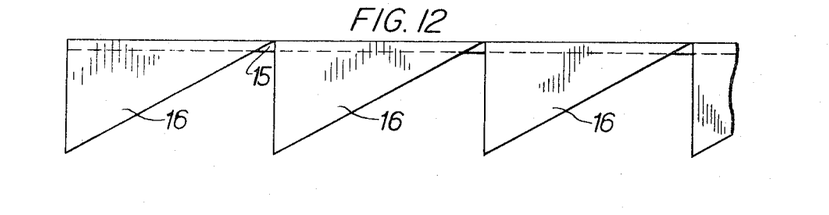
FIG. 12 is a side elevation of part of a building unit according to the invention for a non-cellular structure.

The structure is composed mainly of units according to the invention as illustrated in FIG. 12. The unit is made of wood and comprises a longitudinal rib 15 of rectangular section to one side face of which a succession of right-triangular ply-wood plates 16 are secured by gluing and nailing. To form a two-way roof or other structure, a series A of parallel units is installed as shown in FIG. 13, the units being held at the required spacing by connection of their ribs 15 to a bottom layer of ribs 17 which run normally to the ribs 15 of the series A units. Subsequently, a second series B of the prefabricated units is laid with their ribs normal to the ribs 15 of the units of series A and their triangular plates pointing towards the said ribs of the A units. The triangular plates of each of the B units are connected along their vertical margins with the corresponding margins of plates belonging to the A units. This connection is achieved through the medium of stiffening pieces 18 and to facilitate assembly, these stiffening pieces preferably form part of the prefabricated units of series A so that when the series B units are laid their plates have merely to be glued and nailed or other connected to the pieces 18. Finally, a top layer of ribs 19 is laid across and at right angles to the ribs 15 of the B units, and secured thereto. The complete structure is very strong, locally applied loads being resolved into forces which are transmitted through the units in two directions. As will be seen, the units are very simple to make and to assemble.

To facilitate assembly, the ribs of the units may be provided with captive bolts and/or bolt sockets or merely with registration markings, at appropriate positions for use in connecting the unit ribs to the outer layers of ribs 17 and 19.

The structure may be clad on one or both sides with any appropriate cladding material to conceal or enclose the structure. If desired a layer of sheet cladding may be used in place of one of the outer layers of ribs 3 and 5 for interconnecting the ribs 1 of the A or B units as the case may be. Services such as heating or lighting equipment can be accommodated within the depth of the structure.

The structure has been described as made of wood but the units can be made wholly or partly of metal, concrete, plastic or other material.

Figure 13:
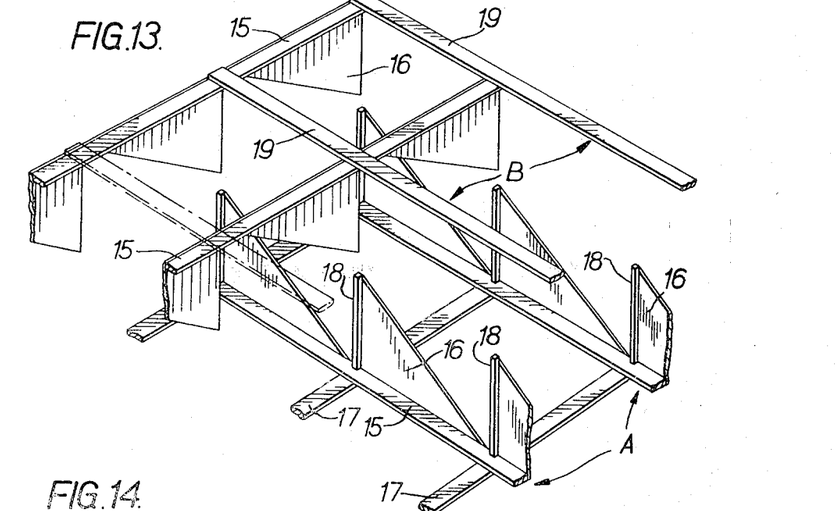
FIG. 13 is an exploded view of a structure formed in part by units according to FIG. 12.
Figure 14:
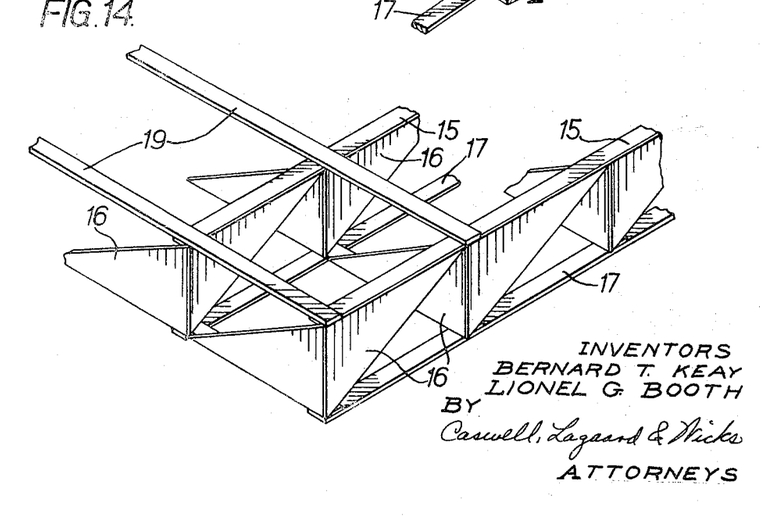
FIG. 14 shows part of the complete structure in perspective from a different view point.
Figure 15:
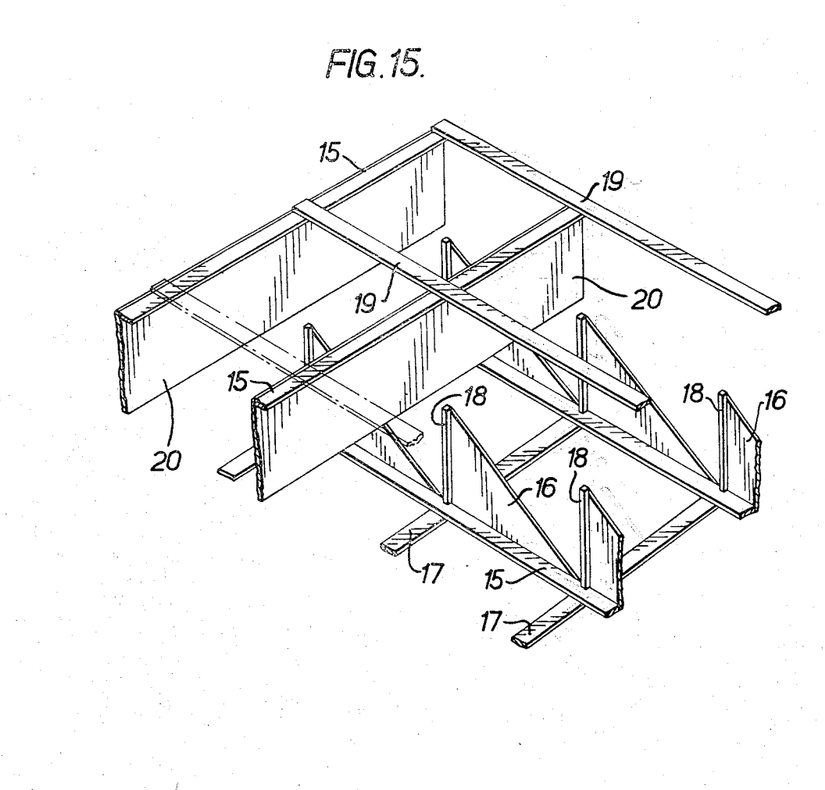
FIG. 15 is an exploded view similar to FIG. 13 of a modified structure according to the invention.

Finally reference is made to FIG. 15 which represents a modification of the structure illustrated in FIGS. 13 and 14. The FIG. 15 structure differs from that shown in such earlier figures in that the units of the upper layer each comprise a single rectangular sheet 20 attached to the rib 15. On assembly, each sheet 20 is attached to all of the stiffening pieces 18 alongside which the sheet 20 extends.

What we claim is:

1. A space structure for building purposes wherein there is a plurality of prefabricated units each comprising at least one longitudinal rib portion and successive pairs of triangular wall portions joining said rib portion along one margin and extending laterally from said one rib portion, the wall portions of said successive pairs lying in two divergent planes; wherein a first series of said units is disposed with their said one rib portions in substantially parallel relation substantially in one layer at one side of said structure and their said wall portions extending depthwise of said structure; a second series of said units is disposed with their said one rib portions located in substantially parallel relation normally to the rib portions of said first series of units and substantially in another layer at the opposite side of said structure, said wall portions of the units of said second series also extending depthwise of said structure; and wherein each said pair of triangular wall portions of each unit of said first series of units is connected with a pair of said wall portions of a unit of said second series of units thereby to form a tetrahedral cell.

2. A space structure according to claim 1 wherein said rib portions of at least one said series of units are interconnected by an outer layer of ribs laid normally to said rib portions of said one series.

3. A space structure wherein there is a plurality of prefabricated units each comprising at least one longitudinal rib portion and a succession of triangular wall portions joining said rib portion along one margin and extending laterally from said one rib portion; wherein a first series of said units have their said one rib portions extending in three different directions and substantially in one layer at one side of said structure and their wall portions extending depthwise of said structure and co-operating to form cells of triangular pyramid form open at said one side of said structure; a second series of said units are disposed with their said one rib portions extending in three different directions and substantially in another layer at the opposite side of said structure and their wall portions extending depthwise of said structure and co-operating to form cells of triangular pyramid form open at said other side of said structure; and wherein said wall portions of said units of said first series extend into the depth of the space occupied by said units of said second series and are connected with the wall portions of the units of said second series thereby to define cells open at both sides of said structure.

4. A space structure for building purposes wherein there is a plurality of prefabricated units each comprising at least one longitudinal rib portion and successive pairs of triangular wall portions joining said rib portion along one margin and extending laterally from said rib portion, the wall portions of said successive pairs lying in two divergent planes; wherein a first series of said units is disposed with their said one rib portions in substantially parallel relation substantially in one layer at one side of said structure and their said wall portions extending depthwise of said structure; wherein a second series of said units is disposed with their said one rib portions located in substantially parallel relation normally to the rib portions of said first series of units and substantially in another layer at the opposite side of said structure, said wall portions of the units of said second series also extending depthwise of said structure; wherein each of said units of said second series has in addition to said one rib portion further longitudinal rib portions extending along and interconnecting the apex portions of the co-planar triangles remote from said one rib portion; and wherein each said pair of triangular wall portions of each unit of said first series of units is connected with a pair of said wall portions of a unit of said second series of units thereby to form a tetrahedral cell.

References Cited by the Examiner

UNITED STATES PATENTS

| | | | |
|---|---|---|---|
| 1,875,188 | 8/1932 | Williams | 52—618 |
| 2,053,135 | 9/1936 | Dalton | 52—615 |
| 2,207,952 | 7/1940 | Stulen | 52—648 |
| 2,420,112 | 5/1947 | Utzler | 52—664 |
| 2,444,133 | 6/1948 | Groat | 52—22 |
| 2,481,046 | 9/1949 | Surlock | 52—615 |
| 2,549,189 | 4/1951 | Gabo | 52—144 |
| 2,960,197 | 11/1960 | Langhans | 52—615 |
| 3,049,196 | 8/1962 | Attwood | 52—648 |

FOREIGN PATENTS

| | | |
|---|---|---|
| 1,035,343 | 1953 | France. |
| 43,294 | 1938 | Netherlands. |

FRANK L. ABBOTT, *Primary Examiner.*

JOHN E. MURTAGH, *Examiner.*